(12) United States Patent
Takayama

(10) Patent No.: US 12,160,668 B2
(45) Date of Patent: Dec. 3, 2024

(54) IMAGE CAPTURING SYSTEM, CONTROL METHOD, AND STORAGE MEDIUM

(71) Applicant: CANON KABUSHIKI KAISHA, Tokyo (JP)

(72) Inventor: Yuiko Takayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 18/046,069

(22) Filed: Oct. 12, 2022

(65) Prior Publication Data

US 2023/0122606 A1    Apr. 20, 2023

(30) Foreign Application Priority Data

Oct. 15, 2021    (JP) .................. 2021-169500

(51) Int. Cl.
   *H04N 23/73*    (2023.01)
   *G06T 7/11*     (2017.01)
   *G06V 10/60*    (2022.01)
   *G06V 10/74*    (2022.01)

(52) U.S. Cl.
   CPC .............. *H04N 23/73* (2023.01); *G06T 7/11* (2017.01); *G06V 10/60* (2022.01); *G06V 10/761* (2022.01); *G06T 2207/10144* (2013.01)

(58) Field of Classification Search
   CPC . G06T 2207/10144; G06T 7/11; G06V 10/60; G06V 10/761; H04N 23/73; H04N 25/533; H04N 25/57; H04N 25/583
   See application file for complete search history.

(56) References Cited

U.S. PATENT DOCUMENTS

| | | | |
|---|---|---|---|
| 9,749,532 B1* | 8/2017 | Hinkel | H04N 23/80 |
| 11,412,154 B2* | 8/2022 | McElvain | H04N 23/73 |
| 2015/0130967 A1* | 5/2015 | Pieper | H04N 23/73 |
| | | | 348/239 |
| 2015/0348242 A1* | 12/2015 | Molgaard | G06T 5/70 |
| | | | 348/241 |
| 2016/0173751 A1* | 6/2016 | Nakata | H04N 23/741 |
| | | | 348/362 |
| 2017/0301069 A1* | 10/2017 | Sato | A61B 1/0005 |

(Continued)

FOREIGN PATENT DOCUMENTS

WO    2017/018188 A1    2/2017

*Primary Examiner* — Amy R Hsu
(74) *Attorney, Agent, or Firm* — Canon U.S.A., Inc. IP Division

(57) ABSTRACT

An image capturing system includes an image capturing unit including an image capturing surface on which pixel blocks each including a plurality of pixels are two-dimensionally arranged, exposure parameters being separately settable for the pixel blocks, a determination unit configured to determine a first exposure parameter and a second exposure parameter so that a difference between the first exposure parameter and the second exposure parameter is greater than or equal to a predetermined value, an exposure control unit configured to set the first exposure parameter determined by the determination unit and the second exposure parameter determined by the determination unit alternately as the exposure parameters for the pixel blocks and configured to control image capturing by the image capturing unit, and a display unit configured to display an image captured by the image capturing unit.

15 Claims, 10 Drawing Sheets

(56) References Cited

U.S. PATENT DOCUMENTS

2021/0243352 A1* 8/2021 McElvain ............ H04N 25/583
2021/0248758 A1* 8/2021 Li ........................ H04N 23/843
2021/0306586 A1* 9/2021 Yamamoto ............. G06V 20/10

* cited by examiner

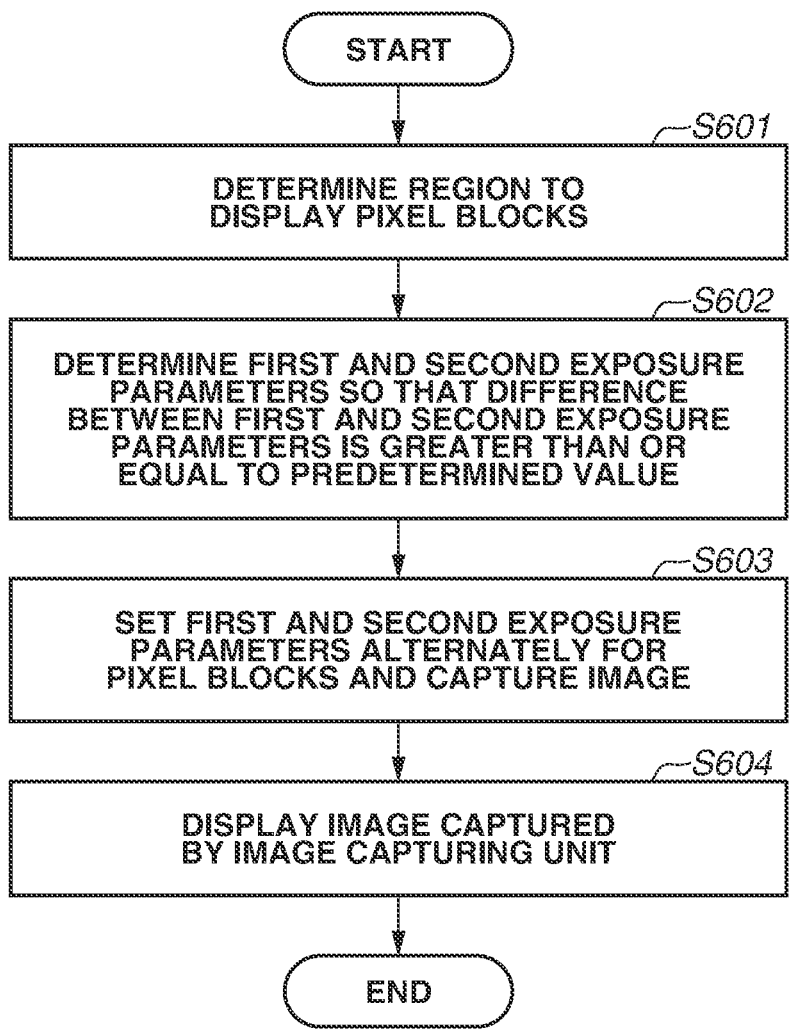

EXPOSURE DIFFERENCE
(THRESHOLD VALUE)

EXPOSURE DIFFERENCE
(THRESHOLD VALUE)

IMAGE CAPTURING SYSTEM, CONTROL METHOD, AND STORAGE MEDIUM

BACKGROUND OF THE DISCLOSURE

Field of the Disclosure

The present disclosure relates to an image capturing system, a control method, and a storage medium.

Description of the Related Art

There have been demands for monitoring cameras that capture images using an increased dynamic range in environments with a significant difference between brightness and darkness or with different lighting.

WO 2017/018188 discusses a technique for increasing a dynamic range by controlling an exposure time for each of a plurality of pixel blocks on an image capturing surface.

SUMMARY OF THE DISCLOSURE

According to an aspect of the present disclosure, an image capturing system includes an image capturing unit including an image capturing surface on which pixel blocks each including a plurality of pixels are two-dimensionally arranged, exposure parameters being separately settable for the pixel blocks, a determination unit configured to determine a first exposure parameter and a second exposure parameter so that a difference between the first exposure parameter and the second exposure parameter is greater than or equal to a predetermined value, an exposure control unit configured to set the first exposure parameter determined by the determination unit and the second exposure parameter determined by the determination unit alternately as the exposure parameters for the pixel blocks and configured to control image capturing by the image capturing unit, and a display unit configured to display an image captured by the image capturing unit.

Further features of the present disclosure will become apparent from the following description of exemplary embodiments with reference to the attached drawings.

BRIEF DESCRIPTION OF THE DRAWINGS

FIG. 6 is a diagram illustrating an example of operations of the image capturing system according to the first exemplary embodiment.

DESCRIPTION OF THE EMBODIMENTS

Various exemplary embodiments of the present disclosure will be described in detail below with reference to the attached drawings. The exemplary embodiments described below are mere examples of implementation of the present disclosure and are to be modified or changed as needed for a configuration of an apparatus to which the present disclosure is applied or for various conditions, and the present disclosure is not limited to the exemplary embodiments described below. Part of an exemplary embodiment described below can be combined with part of another exemplary embodiment described below.

(System Configuration)

Figure 1:
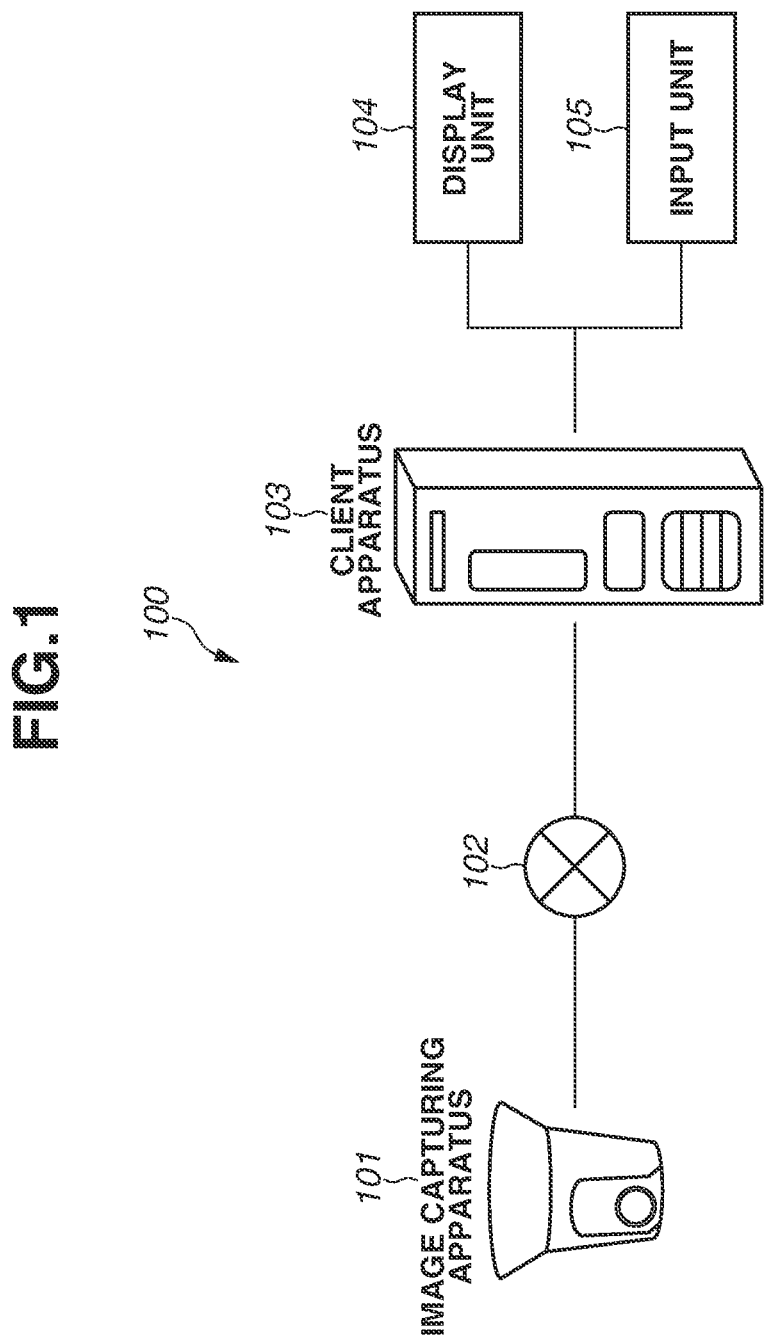
FIG. 1 is a diagram illustrating an example of a configuration of an image capturing system according to a first exemplary embodiment.

A first exemplary embodiment will be described below. FIG. 1 is a diagram illustrating an example of a hardware configuration of an image capturing system according to the present exemplary embodiment.

An image capturing system 100 includes an image capturing apparatus 101, a network 102, a client apparatus 103, a display unit 104, and an input unit 105.

The image capturing apparatus 101 can communicate with the client apparatus 103 via the network 102. The image capturing apparatus 101 captures a subject image, generates an image, and transmits the image to the client apparatus 103 via the network 102. The display unit 104 and the input unit 105 are connected to the client apparatus 103. The image transmitted from the image capturing apparatus 101 is output to the display unit 104 via the client apparatus 103, and the display unit 104 displays the output image. The input unit 105 is a keyboard or a mouse and is used to operate the client apparatus 103. The operations on the client apparatus 103 include an operation of setting an image capturing condition of the image capturing apparatus 101 via the network 102 and pan/tilt/zoom (PTZ) operations.

While the client apparatus 103, the display unit 104, and the input unit 105 are separate components according to the present exemplary embodiment, the client apparatus 103, the display unit 104, and the input unit 105 can be integrated into a single configuration, such as a laptop personal computer (laptop PC) including a touch panel display. The image capturing apparatus 101 and the client apparatus 103 do not have to be connected to each other via the network 102 and can be connected directly to each other. Furthermore, the image capturing apparatus 101, the client apparatus 103, the display unit 104, and the input unit 105 can be integrated into a single configuration, such as a consumer camera including a touch panel display.

(Apparatus Configuration)

Figure 2:
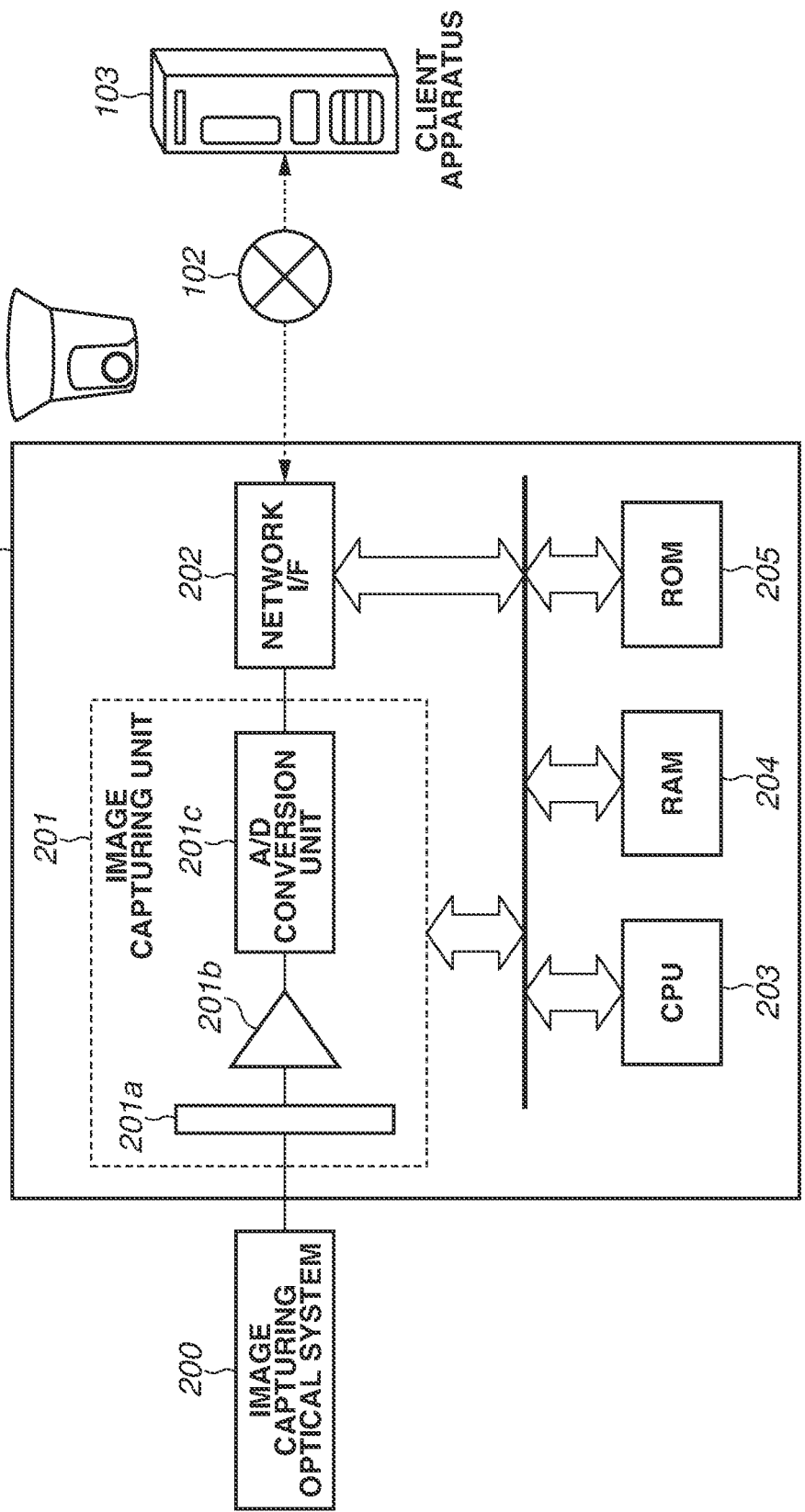
FIG. 2 is a diagram illustrating an example of a configuration of an image capturing apparatus according to the first exemplary embodiment.

FIG. 2 is a diagram illustrating an example of a configuration of an image capturing apparatus according to the present exemplary embodiment. The image capturing apparatus 101 includes an image capturing unit 201, a network interface (network I/F) 202, a central processing unit (CPU) 203, a random access memory (RAM) 204, and a read-only memory (ROM) 205. An image capturing optical system 200 is removably attached to the image capturing apparatus 101.

The image capturing optical system 200 includes lenses that focus light from a subject onto an image capturing surface of an image sensor 201a described below, such as a zoom lens, a focus lens, and an image stabilizer lens.

While the image capturing apparatus 101 and the image capturing optical system 200 are provided as separate removable components according to the present exemplary embodiment, the image capturing apparatus 101 and the image capturing optical system 200 can be integrated into a single configuration, such as a lens-integrated camera.

The image capturing unit 201 captures a subject image formed by the image capturing optical system 200 and generates an image. The image capturing unit 201 includes the image sensor 201a, an amplification unit 201b, and an analog/digital (A/D) conversion unit 201c.

The image sensor 201a photoelectrically converts light from a subject that is focused by the image capturing optical system 200, and the image sensor 201a outputs an image signal. Pixel blocks each including a plurality of pixels (e.g., 128×128 pixels) are arranged two-dimensionally on the image capturing surface of the image sensor 201a (the image capturing unit 201). An exposure parameter can be set individually for each pixel block. The exposure parameter is an exposure-related parameter and includes at least one of an exposure time, an analog gain described below, and an exposure value. The image sensor 201a is, for example, a charge-coupled device (CCD) sensor or a complementary metal oxide semiconductor (CMOS) sensor.

The amplification unit 201b amplifies electric signals output from the image sensor 201a and outputs the amplified signals. The amplification unit 201b is provided to each pixel, and a signal amplification factor (analog gain) of the amplification unit 201b can be set and changed for each pixel block of the image sensor 201a.

The A/D conversion unit 201c performs A/D conversion to convert image signals, which are analog signals, output from the amplification unit 201b into digital signals.

The network I/F 202 is an interface for transmitting image data, which is a digital signal output from the A/D conversion unit 201c, to the client apparatus 103 via the network 102. The image data to be transmitted can be image data that is encoded into a predetermined file format, such as Motion Joint Photographic Experts Group (Motion JPEG), H.264, or H.265, by image processing. The image data can be stored in an internal storage device, such as the RAM 204 or the ROM 205 to be described below, or in a removable storage medium, such as a secure digital (SD) card.

The CPU 203 is a central processing unit that comprehensively controls the image capturing apparatus 101. The RAM 204 temporarily stores computer programs to be executed by the CPU 203. The RAM 204 provides a work area to be used by the CPU 203 for performing processing. The RAM 204 functions as a frame memory and/or a buffer memory.

The ROM 205 stores programs for the CPU 203 to control the image capturing apparatus 101.

Figure 3:
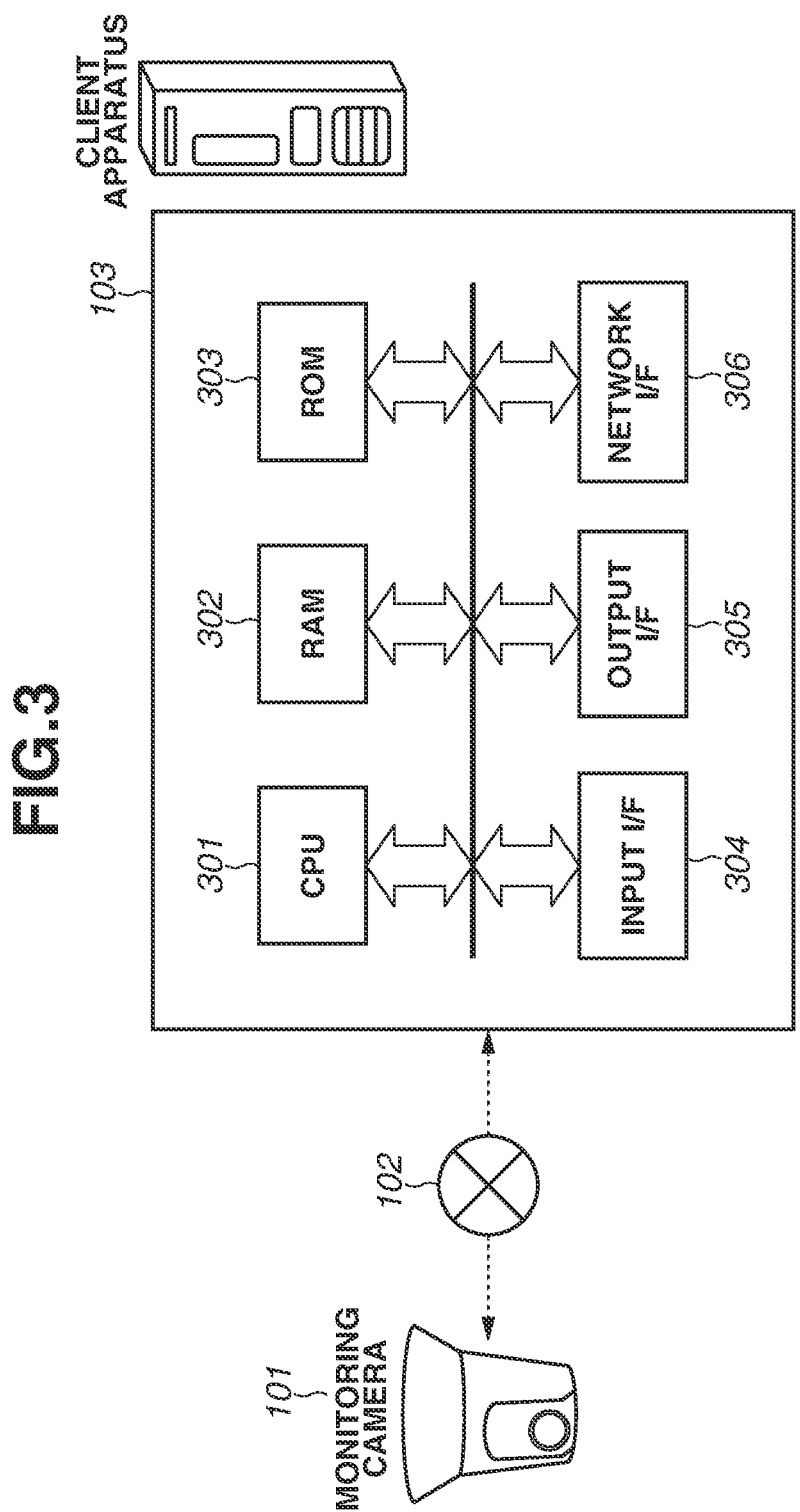
FIG. 3 is a diagram illustrating an example of a configuration of a client apparatus according to the first exemplary embodiment.

FIG. 3 is a diagram illustrating an example of a configuration of a client apparatus according to the present exemplary embodiment. The client apparatus 103 is an information processing apparatus including a CPU 301, a RAM 302, a ROM 303, an input interface (input I/F) 304, an output interface (output I/F) 305, and a network I/F 306.

The CPU 301 is a central processing unit that comprehensively controls the client apparatus 103.

The RAM 302 temporarily stores programs for the CPU 301 to control the client apparatus 103. The RAM 302 provides a work area to be used by the CPU 301 for performing processing. The RAM 302 functions as a frame memory and/or a buffer memory.

The ROM 303 stores programs for the CPU 301 to control the client apparatus 103.

The input I/F 304 is an interface for connecting the input unit 105 and the client apparatus 103 to each other and receives user operations on the client apparatus 103 that are input via the input unit 105.

The output I/F 305 is an interface for connecting to the display unit 104 and outputs images output from the image capturing apparatus 101.

The network I/F 306 is an interface for connecting to the monitoring camera 101 via the network 102 to input operation information to the monitoring camera 101 and receive images output from the monitoring camera 101.

(Functional Configuration)

Figure 4:
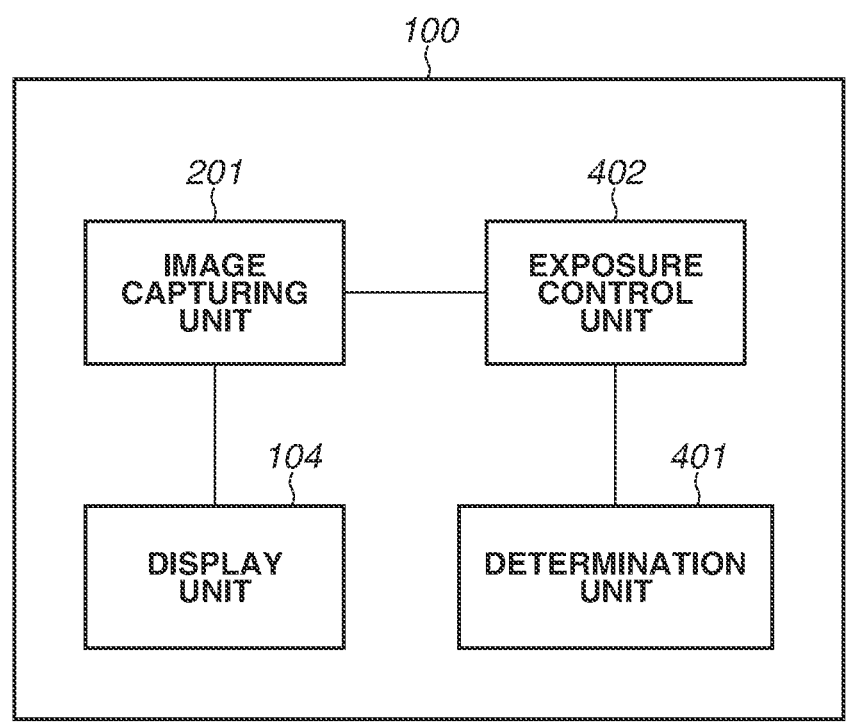
FIG. 4 is a diagram illustrating an example of a functional configuration of the image capturing system according to the first exemplary embodiment.

FIG. 4 is a diagram illustrating an example of a functional configuration of an image capturing system according to the present exemplary embodiment. The image capturing system 100 includes the image capturing unit 201, a determination unit 401, an exposure control unit 402, and the display unit 104. The components illustrated in FIG. 4 are functions that are realized by the CPU 203 (or the CPU 301) by reading a program stored in the RAM 204 (or the RAM 302) or the ROM 205 (or the ROM 303) and executing the read program.

The image capturing unit 201 includes the image capturing surface on which the pixel blocks each including the plurality of pixels are two-dimensionally arranged, and the exposure parameter can be set individually for each pixel block.

The determination unit 401 determines a first exposure parameter and a second exposure parameter so that a difference between the first exposure parameter and the second exposure parameter is greater than or equal to a predetermined value. The first exposure parameter and the second exposure parameter are parameters including at least one of the exposure time, the gain, and the exposure value. Thus, the difference between the first exposure parameter and the second exposure parameter is a difference in exposure time, a difference in gain, and a difference in exposure value. The predetermined value is a threshold value that differs for each of the exposure time, the gain, and the exposure value. Specifically, at least one of the threshold value for the exposure time, the threshold value for the gain, and the threshold value for the exposure value is the predetermined value. The predetermined value is set by a user or a designer.

The exposure control unit 402 performs control to set the first exposure parameter determined by the determination unit 401 and the second exposure parameter determined by the determination unit 401 alternately for the plurality of pixel blocks and to capture an image.

The display unit 104 displays images captured by the image capturing unit 201 under control by the exposure control unit 402.

(Description of Operations)

Operations of the image capturing system according to the present exemplary embodiment will be described below with reference to FIGS. 5A to 11.

Figure 5A:
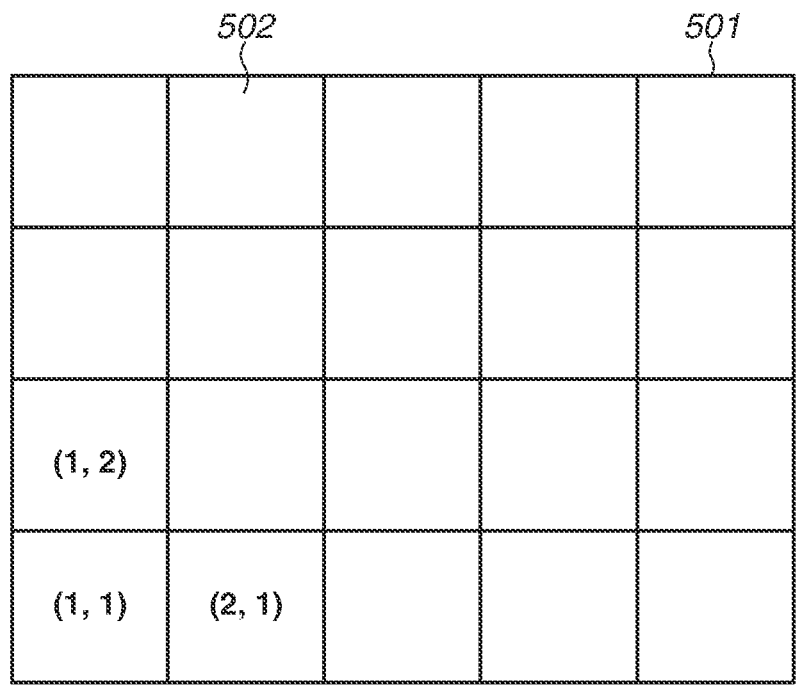
FIGS. 5A and 5B are diagrams illustrating an example of an image capturing surface of the image capturing apparatus according to the first exemplary embodiment and a captured image.
Figure 5B:
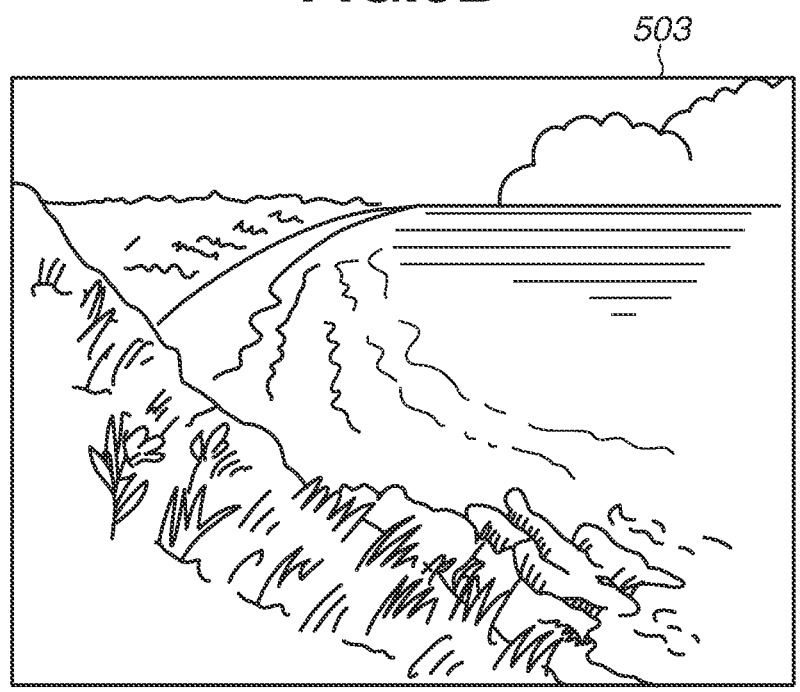

FIGS. 5A and 5B are diagrams illustrating an example of the image capturing surface of the image sensor 201a and a captured image. FIG. 5A is a diagram schematically illustrating an image capturing surface 501, and FIG. 5B is a diagram illustrating an example of an image captured by the image capturing apparatus 101. As illustrated in FIG. 5A, pixel blocks 502 each including a plurality of pixels are two-dimensionally arranged on the image capturing surface 501. FIG. 5B illustrates an image displayed on the display unit 104 in a state before the operations of the image capturing system according to the present exemplary embodiment are started. The positions of the pixel blocks are indicated by a two-dimensional coordinate system, and a block of an ith column and a jth row from the lower left is indicated as (i, j). Accordingly, as illustrated in FIG. 5A, the coordinates of the pixel block at the lowermost and leftmost position are (1, 1), the coordinates of the pixel block adjacent to the right are (2, 1), and the coordinates of the pixel block adjacent to the top are (1, 2).

FIG. 6 is a flowchart illustrating an example of operations of the image capturing system according to the present exemplary embodiment. The operations illustrated in the flowchart in FIG. 6 are started in a case where the CPU 203 (or the CPU 301) reads a program stored in the RAM 204 (or the RAM 302) or the ROM 205 (or the ROM 303) and executes the read program. Thus, the operations of the image capturing system 100 can be performed by the image capturing apparatus 101 or by the client apparatus 103.

In step S601, a region where boundaries of pixel blocks are to be displayed is designated. A designation unit (not illustrated) designates a region where boundaries of pixel blocks are to be displayed in a case where a region is input from the input unit 105. In a case where no region is input from the input unit 105, the pixel blocks of an entire screen are determined as a region where boundaries of pixel blocks are to be displayed. While boundaries of pixel blocks of an entire image are displayed according to the present exemplary embodiment, boundaries of pixel blocks of a region designated by a user via the input unit 105 can be displayed.

Figure 7A:
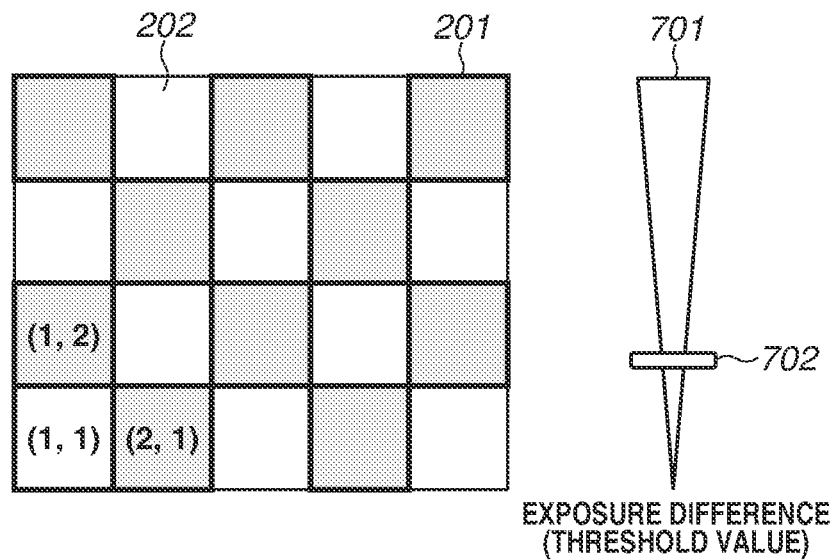
FIGS. 7A and 7B are diagrams schematically illustrating an example of pixel blocks on the image capturing surface of the image capturing apparatus according to the first exemplary embodiment.
Figure 7B:
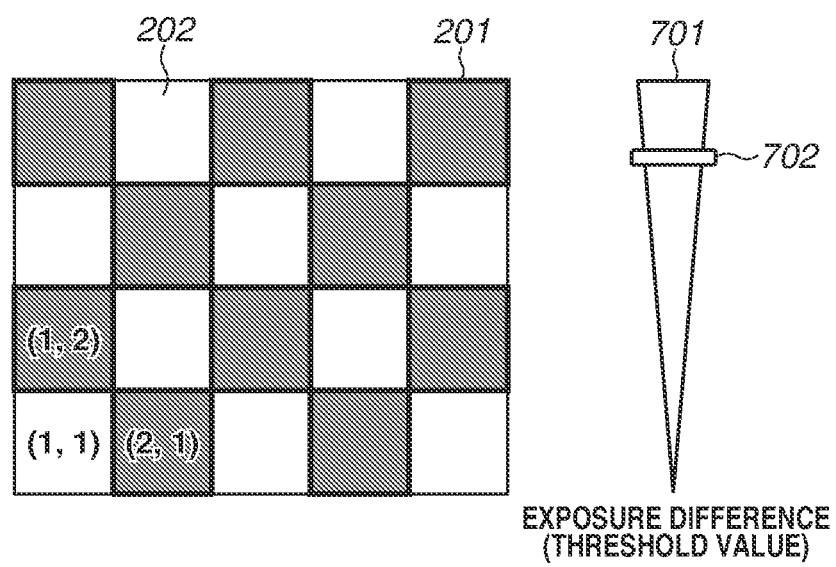

In step S602, the determination unit 401 determines a first exposure time (the first exposure parameter) and a second exposure time (the second exposure parameter) so that a difference between the first exposure time and the second exposure time is greater than or equal to the predetermined value. FIGS. 7A and 7B are diagrams illustrating an example of a screen for setting the difference between the first exposure time and the second exposure time. In FIGS. 7A and 7B, the predetermined value (threshold value) is set by dragging a button 702 on a slider 701 with fingers or a mouse. The determination unit 401 determines the first exposure time and the second exposure time so that the difference between the first exposure time and the second exposure time is greater than or equal to the set predetermined value. According to the present exemplary embodiment, the difference between the first exposure time and the second exposure time is determined as the predetermined value. The first exposure time and the second exposure time can be set to any values so that the difference between the set values is greater than or equal to the predetermined value. For example, in a case where the difference in exposure time is set to 1/60, the first exposure time and the second exposure time can be set to 1/30 and 1/60, respectively, or the first exposure time and the second exposure time can be set to 1/60 and 1/30, respectively.

In step S603, the exposure control unit 402 performs control to set the first exposure parameter and the second exposure parameter alternately for the pixel blocks on the image capturing surface and an image is captured. FIG. 7A schematically illustrates an example of a case where the predetermined value is set to a small value, whereas FIG. 7B schematically illustrates an example of a case where the predetermined value is set to a great value.

Figure 8A:
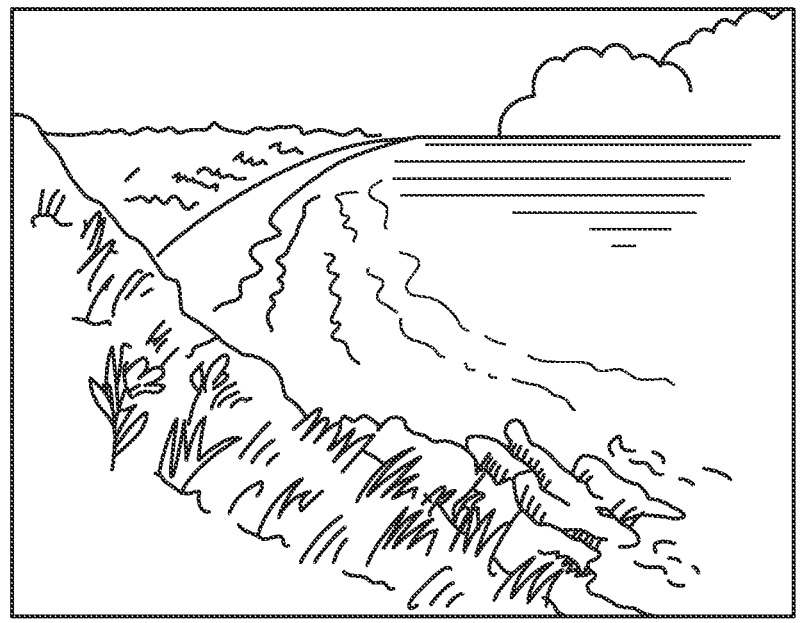
FIGS. 8A and 8B are diagrams illustrating an example of an image captured by the image capturing system according to the first exemplary embodiment.
Figure 8B:
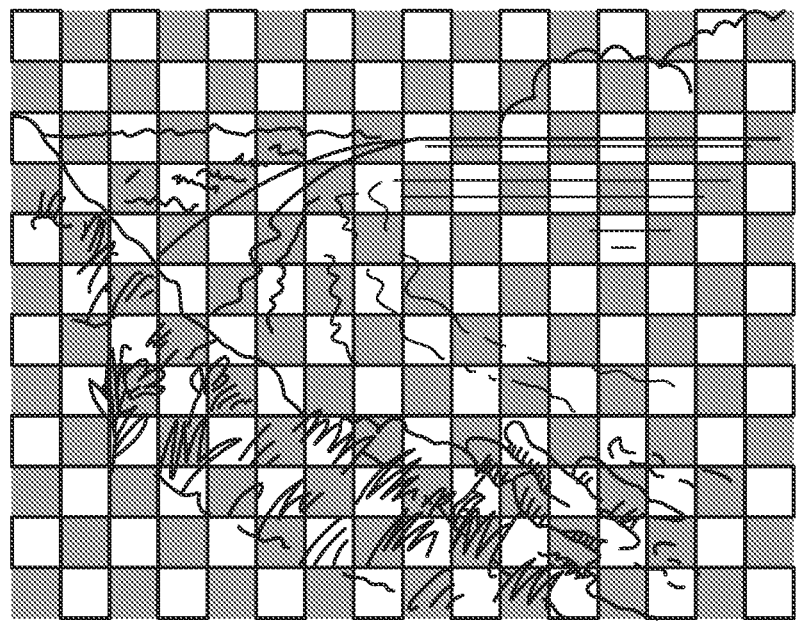

In step S604, the display unit 104 displays the image captured by the image capturing unit 201 under the control performed in step S603. FIGS. 8A and 8B illustrate an example of an image displayed on the display unit 104.

FIG. 8A illustrates an image before the operations are started, whereas FIG. 8B illustrates an image after the operation of step S604 is completed. In FIG. 8A, it is difficult to visually recognize boundaries of pixel blocks for which the exposure parameter is settable. In FIG. 8B, on the contrary, the boundaries of the pixel blocks are more visible. This is effective in a case where a user wishes to assign an appropriate pixel block to a specific subject (e.g., a subject of interest). In a case where the boundaries of the pixel blocks are visually recognized successfully, the size of the pixel blocks can be changed or an image capturing position can be adjusted so that the subject of interest does not appear across the boundaries of the pixel blocks or an outline of the subject fits within the pixel blocks.

As described above, with the image capturing system according to the present exemplary embodiment, the visibility of pixel blocks for which the exposure parameter such as the exposure time is settable improves.

Figure 9A:
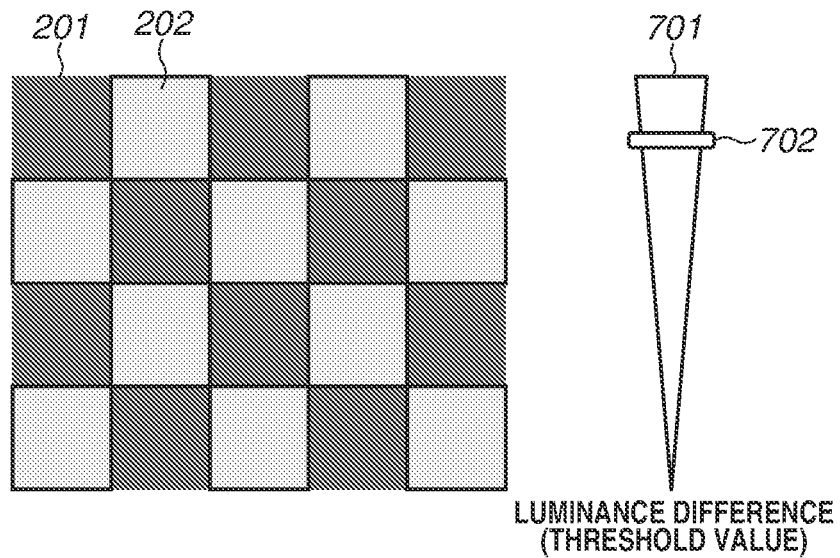
FIGS. 9A and 9B are diagrams schematically illustrating an example of pixel blocks on the image capturing surface of the image capturing apparatus according to the first exemplary embodiment.
Figure 9B:
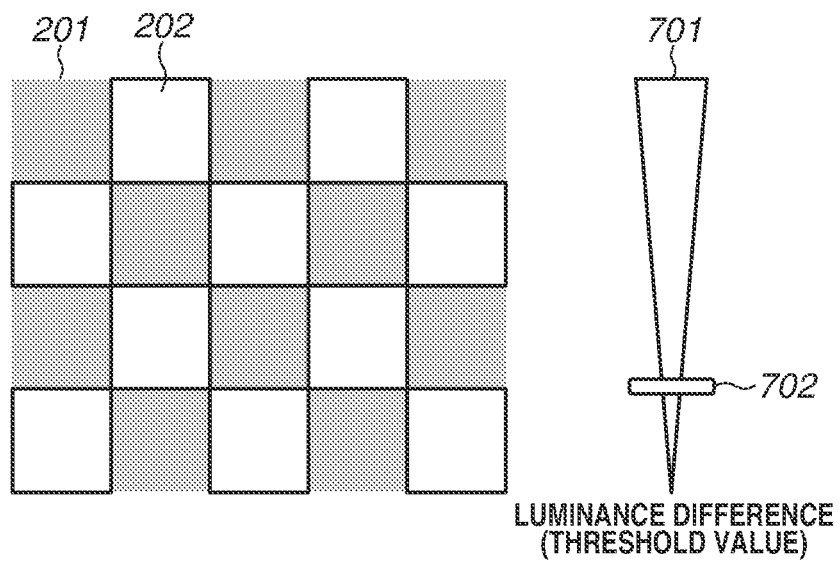

A modified example of the present exemplary embodiment will be described below. While the first exposure parameter and the second exposure parameter are determined so that the difference between the first exposure parameter and the second exposure parameter is greater than or equal to the predetermined value according to the present exemplary embodiment, the determination unit 401 can determine the first exposure parameter and the second exposure parameter so that a difference between a first target luminance and a second target luminance is greater than or equal to a predetermined value. A target luminance is a target value of luminance output from a pixel block. FIGS. 9A and 9B illustrate an example of a screen for setting a luminance difference as the threshold value. As illustrated in FIG. 9A, as the button 702 is moved upward, the difference between the first target luminance and the second target luminance increases, so that the boundaries of the pixel blocks become clearer and easier to recognize visually. On the other hand, as the button 702 is moved downward as illustrated in FIG. 9B, the visibility of the pixel blocks improves to an extent that the visibility of the image does not decrease. The exposure control unit 402 controls the exposure parameter for each pixel block so that the first target luminance and the second target luminance are set alternately as luminances of the pixel blocks.

Figure 10:
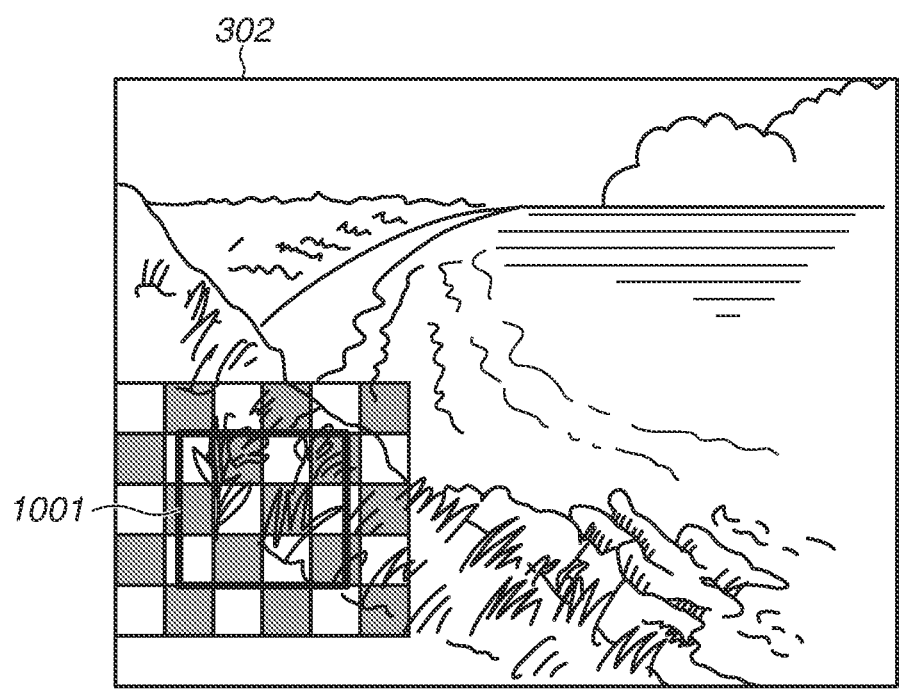
FIG. 10 is a diagram illustrating an image captured by the image capturing system according to the first exemplary embodiment and a designated region.

FIG. 10 illustrates an example of a case where the image capturing system according to the present exemplary embodiment designates only a partial region of an image as a region to enable visual recognition of pixel blocks. As illustrated in FIG. 10, a user can designate a region where pixel blocks are to be displayed by performing a drag operation via the input unit 105. In step S601, in a case where a designated region 1001 is designated, the designation unit (not illustrated) designates the designated region 1001 as a region where pixel blocks are to be displayed. The exposure control unit 402 performs control to set the first exposure parameter and the second exposure parameter alternately for the pixel blocks corresponding to the region designated by the designation unit and an image is captured. Consequently, the user can visually recognize only the pixel blocks corresponding to the designated region.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-169500, filed Oct. 15, 2021, which is hereby incorporated by reference herein in its entirety.

What is claimed is:

1. An image capturing system comprising:
   an image capturing unit including an image capturing surface on which pixel blocks each including a plurality of pixels are two-dimensionally arranged, exposure parameters being separately settable for the pixel blocks;
   at least one processor; and
   at least one memory in communication with the at least one processor and having stored thereon instructions which, when executed by the at least one processor, cause the image capturing system to:
   determine a first exposure parameter and a second exposure parameter so that a difference between the first exposure parameter and the second exposure parameter is greater than or equal to a predetermined value;
   set the first exposure parameter determined and the second exposure parameter determined alternately as the exposure parameters for the pixel blocks and configured to control image capturing by the image capturing unit; and
   display an image captured by the image capturing unit,
   wherein the first exposure parameter and the second exposure parameter are determined so that a difference between a first target luminance and a second target luminance is greater than or equal to a predetermined luminance value.

2. The image capturing system according to claim 1, wherein the exposure parameters are parameters including at least one of an exposure time, a gain, and an exposure value.

3. The image capturing system according to claim 1, wherein the at least one processor further configured to input the predetermined value.

4. The image capturing system according to claim 3, wherein the difference between the first exposure parameter and the second exposure parameter are determined based on the predetermined value input.

5. The image capturing system according to claim 1, wherein the at least one processor further configured to input the predetermined luminance value.

6. The image capturing system according to claim 5, wherein the difference between the first target luminance and the second target luminance are determined based on the predetermined luminance value input.

7. The image capturing system according to claim 1, wherein the at least one processor further configured to designate a predetermined region from the image displayed,
   wherein the first exposure parameter and the second exposure parameter are set alternately as the exposure parameters for the pixel blocks corresponding to the region designated and controls the image capturing by the image capturing unit.

8. A method for controlling an image capturing system, the method comprising:
   setting exposure parameters separately for pixel blocks each including a plurality of pixels and being two-dimensionally arranged on an image capturing surface, and capturing an image;
   determining a first exposure parameter and a second exposure parameter so that a difference between the first exposure parameter and the second exposure parameter is greater than or equal to a predetermined value;
   setting the determined first exposure parameter and the determined second exposure parameter alternately as the exposure parameters for the pixel blocks and controlling image capturing by the image capturing system; and
   displaying a captured image,
   wherein the first exposure parameter and the second exposure parameter are determined so that a difference between a first target luminance and a second target luminance is greater than or equal to a predetermined luminance value.

9. The method for controlling the image capturing system according to claim 8, wherein the exposure parameters are parameters including at least one of an exposure time, a gain, and an exposure value.

10. The method for controlling the image capturing system according to claim 8, further comprising inputting the predetermined value.

11. The method for controlling the image capturing system according to claim 10, wherein the difference between the first exposure parameter and the second exposure parameter is determined based on the input predetermined value.

12. The method for controlling the image capturing system according to claim 8, further comprising inputting the predetermined luminance value.

13. The method for controlling the image capturing system according to claim 12, wherein the difference between the first target luminance and the second target luminance is determined based on the input predetermined luminance value.

14. The method for controlling the image capturing system according to claim 8, further comprising designating a predetermined region from the displayed image, wherein the first exposure parameter and the second exposure parameter are set alternately as the exposure parameters for the pixel blocks corresponding to the designated region, and the image capturing is controlled.

15. A non-transitory computer-readable storage medium storing a program for causing a computer to execute a method comprising:

setting exposure parameters separately for pixel blocks each including a plurality of pixels and being two-dimensionally arranged on an image capturing surface, and capturing an image;

determining a first exposure parameter and a second exposure parameter so that a difference between the first exposure parameter and the second exposure parameter is greater than or equal to a predetermined value;

setting the determined first exposure parameter and the determined second exposure parameter alternately as the exposure parameters for the pixel blocks and controlling image capturing by the image capturing system; and displaying a captured image, wherein the first exposure parameter and the second exposure parameter are determined so that a difference between a first target luminance and a second target luminance is greater than or equal to a predetermined luminance value.

\* \* \* \* \*